Feb. 10, 1959
O. A. WILLIAMS
2,873,143
APPARATUS FOR AND METHOD OF HANDLING FINE PULVERULENT
MATERIAL IN A VACUUM CONVEYOR
Filed April 1, 1957
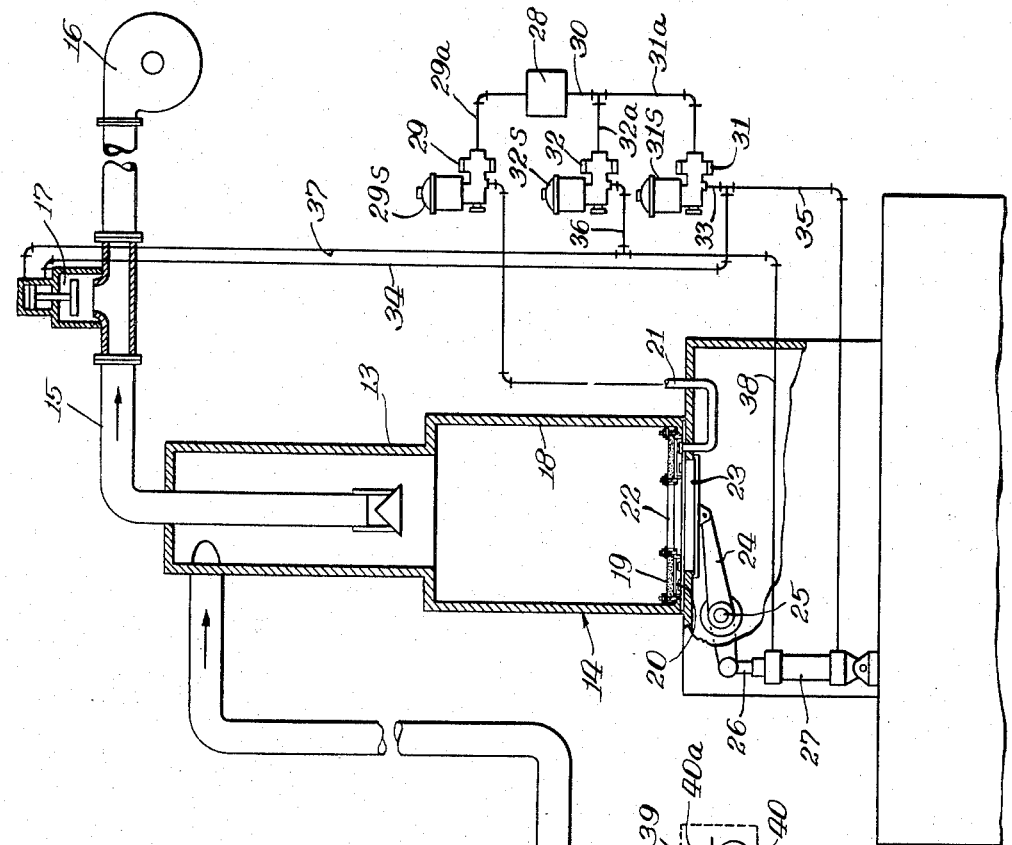
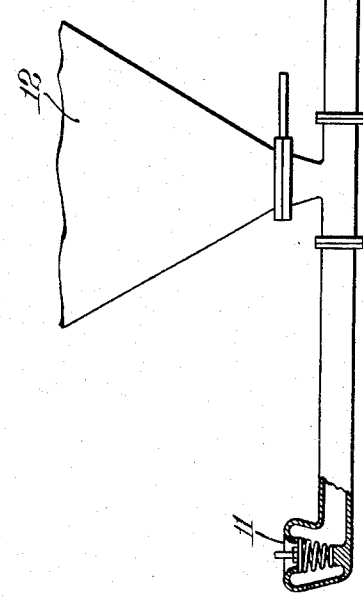
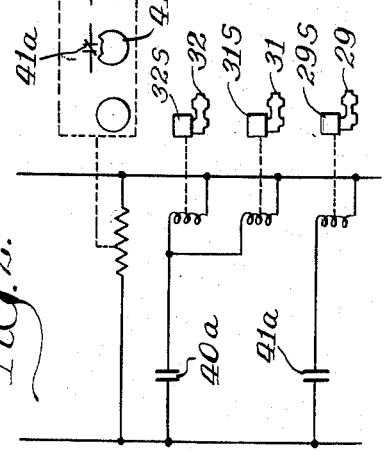
INVENTOR.
Orville A. Williams,
BY Schroeder, Hofgren,
Brady & Wegner
Atty's

United States Patent Office 2,873,143
Patented Feb. 10, 1959

2,873,143

APPARATUS FOR AND METHOD OF HANDLING FINE PULVERULENT MATERIAL IN A VACUUM CONVEYOR

Orville A. Williams, Mount Prospect, Ill., assignor to United Conveyor Corporation, a corporation of Illinois Application April 1, 1957, Serial No. 649,723

5 Claims. (Cl. 302—17)

This invention relates to a method of and apparatus for rapidly discharging pulverulent material such as furnace ash from the receiver of a vacuum conveyor system.

Vacuum conveyor systems are commonly used for transporting fine pulverulent material, such as very fine ash which must be moved from furnace dust collector hoppers to a storage disposal system. Such equipment is commonly used in conjunction with large electric power plant boilers, which produce enormous quantities of hot ash which must be disposed of rapidly and without releasing an undue amount of dust to the atmosphere.

A conventional construction for the transportation of ash in a pneumatic conveyor includes a centrifugal ash separator and receiver where the ash is separated from the air stream in which it is conveyed, and held in a receiving device. The ash must then be discharged periodically from the bottom of the receiving device by opening a dump gate to pass it to a hopper, a storage device, or into another conveyor system of some sort. Commonly the ash is discharged into a storage bin.

In order for a pneumatic system to have a high capacity for handling ash, it is necessary to operate under fairly high vacuum. A typical system requires a vacuum of approximately —3 inches Hg just to maintain air flow. The conveyor is loaded at a high rate, which increases the resistance to flow of air and material in the vacuum system; so that a system for handling a large volume of ash must operate in the range of —20 to —25 inches Hg. However, with ash, and particularly with very fine furnace ash, it is not possible to operate at this high a vacuum without causing the ash in the receiving device to compact so solidly that it cannot be quickly removed by the opening of the dump gate.

Apparently the cause of this phenomenon is that the high vacuum removes so much air from the ash in the bottom of the receiver that the ash packs extremely heavily, almost as a solid, so that it can arch between the walls, and can form solid cakes on a dump gate in the bottom of the receiver. It has heretofore been considered impractical to operate in the conveying of fine ash at a vacuum below about —15 inches Hg. At —16 inches Hg packing occurs to such an extent that receiver discharge is impractically slow; and the situation becomes worse at higher vacuum. In fact, there have been instances in which a dump gate which occupied the entire bottom of a 30 inch diameter receptacle was swung to a vertical position and a solid mass of ash about a foot to eighteen inches thick remained suspended on the vertical gate. Eventually enough air works its way into the compacted ash to cause it to drop off the gate; but this may take half to three-quarters of a minute; and this is much too long for any practical ash handling or ash discharge system.

In accordance with the present invention, the ash receiver of the pneumatic conveyor is provided with a bottom dump gate which is only a portion of the diameter of the bottom of the receptacle, and the floor of the receptacle surrounding the dump gate is formed of porous stone with an annular air chamber beneath it so that air under pressure may be introduced in diffused form to the ash in the bottom of the receiver in order to fluidize it when the dump gate is opened. This effectively neutralizes the compacting effect produced by high vacuum operation, and permits the vacuum conveyor to be operated successfully at pressures of —22 to —25 inches Hg with extremely fine ash.

The entire device is operated by an electric timing unit which provides a cyclical operation. A practical cycle is of two minutes' duration, with loading of the receiver occupying 113 seconds and discharge 7 seconds, while the aerating unit starts 3 seconds before the end of the loading period and continues through the discharge period.

The value of the present method and apparatus is apparent from the fact that a typical vacuum conveyor system can handle about 21.7 tons of ash an hour when operating at —15 inches Hg; but can handle about 36 tons at —22 inches Hg, and 39 tons at —25 inches Hg. Thus, the method and apparatus of the present invention permit the ash handling capacity of a typical vacuum system to be increased between 65 and 80% over its capacity when constructed and operated in the conventional manner.

The apparatus of the present invention is illustrated in a preferred embodiment in the accompanying drawings, in which:

Fig. 1 is a generally schematic view, partially in elevation and partly in section, of a vacuum conveyor system constructed in accordance with the invention, combined with a schematic pneumatic operating circuit; and Fig. 2 is an electric control circuit for the device.

Referring to the drawings in greater detail, and referring first to Fig. 1, a vacuum conveyor system includes a feed duct 10 having an air inlet 11, an ash hopper 12 from which ash may enter the feed duct 10, a centrifugal separator 13 from which ash may drop out of the vacuum air stream into a receiver 14, and a vacuum line 15 communicating with a suction blower 16, the line 15 being provided with an air actuated interrupter valve 17 which is operated by a solenoid controlled valve to vent air to the atmosphere when it is desired to stop conveyor operation.

The ash receiver 14 has a side wall 18 and an annular bottom plate 19 of porous stone beneath which is an air chamber 20 communicating with which is an air supply line 21 by means of which air may be forced through the stone 19 in diffused form so as to aerate, or fluidize ash in the receiver 14. The annular porous stone 19 surrounds a discharge opening 22 in the bottom of the receiver 14, and a dump gate 23 has an operating arm 24 which is journalled on a shaft 25 and connected to the piston rod 26 of a two-way air cylinder 27, by means of which the dump gate 23 may be moved between the closed position of Fig. 1, and a substantially vertical open position.

The pneumatic operating system for the device includes a pressure reduction station 28 through which air from a high pressure (not shown) enters the system. A fluidizing control line 29a extends from the pressure reduction station 28 to a three-way fluidizing control valve 29 which is actuated by a solenoid 29s, to control the flow of air through the fluidizing supply line 21.

A feed and discharge control line 30 acts through control lines 31a and 32a, communicating with valves 31 and 32, respectively, actuated by solenoids 31s and 32s, respectively. Valve 31 terminates material feed and starts material discharge, while valve 32 re-establishes material feed and stops material discharge. Thus, a discharge line 33 from valve 31 connects with a vacuum breaker line 34 to actuate the breaker cylinder and piston 17 to break the vacuum in line 15, while a second air pressure line 35 is connected with the lower end of the air cylinder 27 to open the dump gate 23. The valve 32 feeds a line 36 which in turn connects with a control line 37 for closing the vacuum breaker and re-establishing the feed of material, and with a gate closing line 38 which connects with the upper end of the air cylinder 27 to close the gate 23.

As seen in Fig. 2, operation of the valves 29, 31 and 32, through their solenoids 29s, 31s and 32s, is accomplished by a standard cycle timer 39 having cams 40 and 41 which act through switches 40a and 41a, respectively, to control the operation of the solenoids for the valves.

The timer is so arranged that a total operating cycle is 120 seconds. At zero time the vacuum breaker 17 and discharge gate 23 are closed by operation of solenoid 32s and valve 32, and fluidizing air through line 21 is cut off through operation of valve 29. Filling of the receiver 14 occupies 113 seconds of the entire cycle, but at 110 seconds solenoid 29s is operated by cam 41 to open the three-way valve 29 and admit air through the fluidizing line 21 in order to start fluidizing the ash in the receiver. At 113 seconds of the cycle cam 40 operates to energize solenoid 31s, opening valve 31, vacuum breaker 17 and dump gate 23. Seven seconds is adequate time to completely discharge all ash from the receiver 14, and the cycle terminates when cam 40 de-energizes solenoid 31s and energizes solenoid 32s. This permits valve 31 to bleed air from the lower ends of breaker 17 and cylinder 27 while valve 32 operates to close the vacuum breaker and the dump gate.

The foregoing detailed description is given for clearness of understanding only, and no unnecessary limitations should be understood therefrom, as some modifications will be obvious to those skilled in the art.

I claim:

1. In a vacuum conveyor system for handling fine pulverulent material, in combination: a material receiving chamber having a bottom provided with a discharge opening; a discharge gate for said opening; aerating means for fluidizing material in the lower part of the chamber; vacuum conveyor means operable at negative pressures substantially below —16 inches Hg, said conveyor means including a separator for depositing material in the receiving chamber; and timer controlled means for cyclically delivering material to the chamber with the aerating means inoperative and the discharge gate closed and then opening the gate while operating the aerating means and stopping the vacuum means.

2. In a vacuum conveyor system for handling fine pulverulent material, in combination: a material receiving chamber having a bottom provided with a discharge opening; aerating means for fluidizing material in the lower part of the chamber; a discharge gate for the discharge opening; an air cylinder unit for opening and closing said gate; vacuum conveyor means operable at negative pressures substantially below —16 inches Hg, said conveyor means including a separator for depositing material in the receiving chamber; means for raising pressure in the conveyor means substantially to atmospheric; and an electric control system including a timer to sequentially operate the vacuum conveyor means for a predetermined time, raise the pressure in the conveyor means substantially to atmospheric, start said aerating means to fluidize material in the chamber, admit air to the air cylinder to open the gate for a predetermined time and then close it, stop said aerating means, and then reduce the pressure in the vacuum conveyor means to resume operation of the conveyor.

3. In a vacuum conveyor system for handling fine pulverulent material: a material receiving chamber having a discharge opening in its bottom portion; a discharge gate for said opening; aerating means for fluidizing material in the lower part of the chamber; vacuum conveyor means operable at negative pressures substantially below —16 inches Hg, said conveyor means including a separator for depositing fine pulverulent material in the chamber; and cycling means for cyclically starting and stopping the conveyor and cyclically operating the aerating means and opening the discharge gate in timed relationship with the starting and stopping of the conveyor.

4. The system of claim 3 in which the cycling means includes a timer which first starts the aerating means and then simultaneously stops the vacuum conveyor and opens the discharge gate.

5. The system of claim 4 in which the timer is so arranged that the aerating means operates for less than 10% of a total cycle from one conveyor start to the next.

References Cited in the file of this patent

UNITED STATES PATENTS

| | | |
|---|---|---|
| 2,514,333 | Mylting | July 4, 1950 |
| 2,556,058 | Boon | June 5, 1951 |
| 2,631,759 | Hoopes | Mar. 17, 1953 |
| 2,756,981 | Muller | July 31, 1956 |